(12) United States Patent
Barjon et al.

(10) Patent No.: US 8,445,811 B2
(45) Date of Patent: May 21, 2013

(54) DEVICE FOR THE WELD JOINING OF SHEET METAL STRIPS

(75) Inventors: Stéphane Barjon, Montrond les Bains (FR); Hervé Thomasson, Seyssuel (FR); Jean Perret, Essertines-en-Chatelneuf (FR)

(73) Assignee: Siemens VAI Metals Technologies SAS, Saint-Chamond (FR)

( * ) Notice: Subject to any disclaimer, the term of this patent is extended or adjusted under 35 U.S.C. 154(b) by 1013 days.

(21) Appl. No.: 12/441,753

(22) PCT Filed: Aug. 8, 2007

(86) PCT No.: PCT/FR2007/001355
§ 371 (c)(1),
(2), (4) Date: Apr. 16, 2009

(87) PCT Pub. No.: WO2008/037861
PCT Pub. Date: Apr. 3, 2008

(65) Prior Publication Data
US 2009/0294418 A1 Dec. 3, 2009

(30) Foreign Application Priority Data
Sep. 22, 2006 (FR) ...................................... 06 08349

(51) Int. Cl.
*B23K 26/00* (2006.01)

(52) U.S. Cl.
USPC ................................ 219/121.64; 219/121.85

(58) Field of Classification Search
USPC .............. 219/121.64, 121.63, 121.85; 83/613
See application file for complete search history.

(56) References Cited

U.S. PATENT DOCUMENTS

| 3,893,361 | A | * | 7/1975 | Harris | 83/375 |
| 4,623,777 | A | * | 11/1986 | Aihara et al. | 219/121.6 |
| 4,626,651 | A | | 12/1986 | Taniguchi et al. | |
| 4,840,303 | A | * | 6/1989 | Fujii et al. | 228/164 |
| 5,045,668 | A | * | 9/1991 | Neiheisel et al. | 219/121.83 |
| 5,229,571 | A | * | 7/1993 | Neiheisel | 219/121.63 |
| 5,266,770 | A | | 11/1993 | Noe | |
| 5,536,915 | A | * | 7/1996 | Peru et al. | 219/121.63 |
| 5,614,112 | A | * | 3/1997 | Peru et al. | 219/121.63 |

(Continued)

FOREIGN PATENT DOCUMENTS

| EP | 0389897 A2 | 10/1990 |
| EP | 0482223 A1 | 4/1992 |
| EP | 0974408 A1 | 1/2000 |
| EP | 1157753 A2 | 11/2001 |

(Continued)

*Primary Examiner* — Sang Paik
(74) *Attorney, Agent, or Firm* — Laurence A. Greenberg; Werner H. Stemer; Ralph E. Locher (57) ABSTRACT

A device for the laser weld joining of sheet metal strips includes the following elements: a main frame, a laser welding unit including a laser beam generator for welding the sheet metal strips to be joined and a welding head, a clamping jaw unit supported by the frame and used to clamp the sheet metal strips, and a shearing unit for shearing the head and tails of the sheet metal strips to be joined. The shearing unit includes upper blades mounted to a blade holder and lower blades which can move in relation to the upper blades and which are designed to shear a strip, as well as a blade connecting structure fixed to the frame, the above-mentioned welding head being mobile between the blade holder and the lower blades.

14 Claims, 6 Drawing Sheets

| U.S. PATENT DOCUMENTS | | | |
|---|---|---|---|
| 5,977,511 A | 11/1999 | Meier et al. | |
| 6,161,460 A | 12/2000 | Johnson et al. | |
| 6,202,912 B1 | 3/2001 | Perret et al. | |
| 6,462,299 B1 | 10/2002 | Takeda et al. | |
| 6,476,344 B1 * | 11/2002 | Fields et al. | 219/121.63 |
| 2003/0057191 A1 * | 3/2003 | Wright et al. | 219/121.63 |
| 2005/0092719 A1 * | 5/2005 | Wright et al. | 219/121.63 |
| 2005/0127050 A1 * | 6/2005 | Wright et al. | 219/121.64 |

| FOREIGN PATENT DOCUMENTS | | |
|---|---|---|
| JP | 62187584 A | 8/1987 |
| JP | 11058122 A | 3/1999 |
| JP | 2000246469 A | 9/2000 |
| RU | 2095431 C1 | 11/1997 |
| RU | 2150362 C1 | 6/2000 |
| SU | 1630160 A1 | 6/1992 |

* cited by examiner

PRIOR ART

DEVICE FOR THE WELD JOINING OF SHEET METAL STRIPS

BACKGROUND OF THE INVENTION

Field of the Invention

The present invention relates, generally speaking, to the field of the devices for the butt welding of two sheet metal strips by means of a Laser beam. This invention is particularly suited to the welding performed for the joining together of sheet metal coils at the entry of the sheet metals continuous conveyer line in the steel industry.

More particularly, the invention relates to a device for Laser weld joining of sheet metal strips running in a steelworks of continuous processing comprising at least:
- a main frame;
- a Laser welding unit comprising a generator of Laser beam for the welding of sheet metal strips to join;
- a clamps unit carried by said frame for the clamping of sheet metal strips;
- a shearing unit (C) for the shearing of heads and tails of sheet metal strips to join;

The lines of production, of transformation and of coating of steels are today designed for a continuous processing often linking up several successive processings without intermediate steps in order to improve steelworks productivity.

To do that, it is often necessary to butt weld two sheet metals in order to get a sheet metal strip without discontinuity capable of running in the steel conveyer line. To do that, one therefore weld joins a tail of a sheet metal strip inserted on the conveyer line with the head of another strip known as next strip.

The running of the strip having to remain continuous on the whole set of the conveyer line and the joining being realized in a fixed position, the continuous conveyer lines comprise devices that accumulate the strip by multiple loopings during the joining then return it. Such an accumulation device of this type is described in patent EP 0 974 408.

The joining operation is realized by a welder that comprises, in addition to the welding device in itself (butt weld by flashing, by electrode wheel, by metal inert gas, by Laser) two clamps for immobilizing the sheet metals, one located downstream by comparison with the sheet metal strip running direction and for immobilizing the coil tail already inserted in the conveyer line, the other being located upstream in order to selectively immobilize the head of the coil that has just been inserted.

These welders must be capable of making butt joints of high quality. As, indeed, the breaking of a weld during the running of the sheet metal strip or even the necessity to redo a weld considered incorrect cause important operating losses and the rate of breaking or of re-welding must stay as low as possible.

The decisive criteria of a weld quality essentially are:
- the metallurgical quality of the welded butt joint, particularly for steels sensitive to possible metallurgical deteriorations of the area affected thermally by the welding;
- the welded section that should ideally be without extra thickness and under-thickness;
- the continuity and compactness of the welded butt joint.

The metallurgical quality depends also on the welding process used and on the thermal cycle induced by this process in the affected area, as well as on various processes of pre- and post-heating or of annealing made locally in the welder itself or immediately downstream.

The state of the welded section depends on the process and on the means of finishing implemented after welding. The butt welding by flashing makes an overlap which is necessary to plane and the welders by flashing known in the field as "flash-butt" are in general equipped with an embedded planning unit. The welding by electrode wheel also makes an extra thickness due to the overlapping of the sheet metals to weld and that most often has to be squeezed by ironing roll devices embedded in the welders. The Laser welding enables a sharp management of the welded section furthermore associated with a very limited area affected by the heat.

The continuity and the compactness of the butt joint are essentially depending on the welding parameters used. For the most part, these parameters are electrical and are generally easy to manage in a reliable fashion.

Another parameter however is of prime importance for the continuity and the compactness of the welded butt joint as much as for its section, namely the straightness of the edges to weld and their relative positioning during the welding.

In order to ensure the joining weld quality, the ends of the strips to weld need to be aligned and straight. To do that, the joining assemblies comprise various centring devices upstream and downstream from the welder that enable to align the sheet metal strips and means of shearing of the heads and tails of the sheet metal strips.

Thus the welders generally comprise means of shearing enabling to make the cutting of the ends of the strips to join. The considerable range extension of metal types and of thickness of steel processed in the continuous conveyer lines and the constantly strengthened productivity requirements have been directing for 20 years the in-line joining welders towards the Laser process.

The Laser process indeed enables to extend the range of products (sheet metals to weld) towards very small thicknesses. It also enables to limit the thermally affected areas of a very wide range of metal types among which can be counted special metallurgy steels designed for the automotive industry.

Historically, the Laser welders have been designed based on welder architectures of the above-mentioned "flash-butt" type and of electrode wheel type they were intending to replace. The systems of shearing of the heads and tails of strips are off-line of sheer metal strips conveyer line, and are installed on gooseneck-shaped brackets that are inserted in the welder frame to make the two cuttings then are put back off-line in order to make room for the welding operation.

Such a shearing system used jointly with the Laser process is described as far back as 1984 in patent document U.S. Pat. No. 4,626,651.

Figure 1:
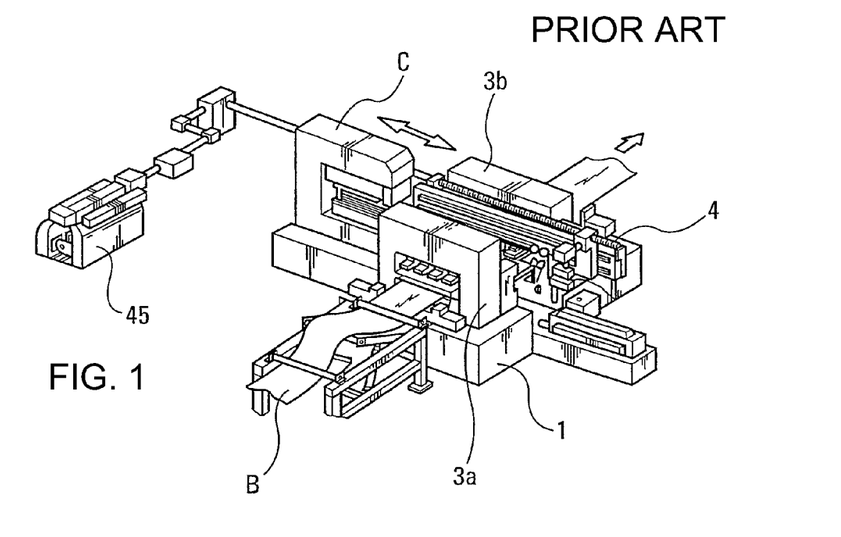
FIG. 1 represents a device of prior art comprising a shearing unit moving by comparison with the main frame of the device.

A joining device of the type previously defined, enabling such a weld joining of sheet metal strips, is described for example in the patent document EP 1 157 753. This device of prior art which is described in FIG. 1 is supplied with a welding unit 4 in a fixed position by comparison with the main frame 1 and thus by comparison with an axis "A" of running of the sheet metal strips. This welding unit 4 comprises a generator of Laser beam 45. This device 0 also comprises a shearing unit C moving by comparison with the main frame 1 in order to make the size of the gap between the shearing unit C and the main frame 1 vary, the shearing unit thus being moving between a shearing position wherein the shearing unit C is centred on the strip running axis "A" and a standing back position wherein the shearing unit C is off-centred by comparison with said axis.

BRIEF SUMMARY OF THE INVENTION

In this context, the present invention is aiming at providing a joining device enabling to improve the precision of joining of sheet metal strips so as to allow weld homogeneity and so as to reduce for example the risks of stopping of the sheet metal strips running because of weld breaking.

To that purpose, the device for Laser weld joining of sheet metal strips of the invention, besides in accordance with the generic definition given by the preamble defined previously, is essentially characterized in that the shearing unit comprises at least a first upper blade and at least a first lower blade moving from one another and adapted to shear a sheet metal strip and in that the shearing unit comprises at least a joint structure of said first blades, this joint structure being in fixed relation to said frame.

The invention enables an improvement of precision and of repetitiveness of the cuttings of the shearing unit which is in a fixed position by comparison with the device frame (that is to say fixed by comparison with the frame) thanks to the joint structure of said first blades that is in a fixed relation with said frame.

Thanks to this improvement of the quality of shearing of the sheet metal strips edges, these strips can directly be Laser welded without necessarily need means of measurement and of correction of the position of the strips ends.

Thanks to this improvement of the cuttings precision, the invention enables to simplify the process of joining the sheet metal strips because it is not necessarily needed anymore to reposition the sheared sheet metal strips from one another to make them parallel to one another before welding them.

To this same purpose, the invention also relates to a device for Laser weld joining of sheet metal strips running in a steelworks of continuous processing comprising at least:
  a main frame;
  a Laser welding unit comprising a generator of Laser beam for the welding of sheet metal strips to join;
  a clamps unit carried by said frame for the clamping of sheet metal strips, this clamps unit comprising first and second clamps each adapted to the clamping of a sheet metal strip;
  a shearing unit for the shearing of heads and tails of sheet metal strips to join.

This device of the invention being characterized in that the shearing unit comprises an upper blades holder, of first and second upper blades fastened on said upper blades holder in order to be in spaced relation with one another, and of first and second lower blades moving by comparison with the upper blades and adapted to shear a sheet metal strip, the shearing unit comprising at least a joint structure of said first blades, this joint structure being in fixed relation to said frame and the welding unit furthermore comprising a welding head mounted for sliding in order to be able to move in a space located between the upper blades holder.

The fact of having upper blades carried by the same blades holder enables to fasten these upper blades from one another which improves the precision of each cutting of strips made by the upper blades so as the precision of relative positioning of the cuttings. The outcome of it is an improvement of the quality of welding of the strips thus precisely cut.

The fact that the upper blades holder and the lower blades are linked together through the joint structure fixed to the frame also improves the precision of the cuttings.

The fact that the welding head can be moved between the upper blades holder and the lower blades also enables to improve the positioning precision of this head by comparison with the upper blades holder and consequently to improve the positioning precision of the Laser beam directed by the welding head to the edges of strips cut beforehand by the blades.

Overall this combination of characteristics enables to improve the quality of the weld by allowing a precision of cutting and of positioning of the sheet metal edges by comparison with the Laser beam.

Preferably the lower and upper blades are disposed to be moving between said first and second clamps.

One can see for example that the shearing unit furthermore comprises:
  a second upper blade in spaced relation with the first upper blade, these upper blades being in fixed relation with one another;
  a second lower blade in spaced relation with the first lower blade, these lower blades being in fixed relation with one another, the second blades being moving from one another and being adapted to shear a sheet metal strip.

This embodiment enables to cut two sheet metal strips simultaneously, which allows a saving of time in the operation of shearing/cutting.

Preferably the upper and lower blades are parallel to one another, the first blades being sliding along and on both sides of a first shearing plane and the second blades being sliding along and on both sides of a second shearing plane.

This parallelism between blades enables to obtain cuttings of the edges of the sheet metal strips parallel to one another, as it happens these cuttings are a cutting of a tail of a sheet metal and a cutting of a head of another sheet metal. This blades parallelism also enables to ease the welding because the ends to weld are cut parallel to one another and can thus be brought closer to one another while keeping an inter-sheet metals gap controlled and relatively constant along the whole width of the sheet metals (that is to say along the cuttings) which allows to obtain a homogeneous weld.

To that purpose the lower blades are preferably mounted on a lower tool holder support shared by the lower blades, and the upper blades are preferably mounted on an upper blades holder also called upper tool holder support shared by the upper blades.

One can see for example that the clamps unit comprises first and second clamps each adapted to the clamping of a sheet metal strip and that said blades are disposed to be moving between said first and second clamps.

In this embodiment the shearing planes are located between the first and second clamps.

One can see for example that said joint structure comprises two posts in fixed relation to said main frame and a beam extending between these posts, said at least one upper blade being supported through said beam.

This embodiment is advantageous because the posts linked together by a beam are forming a joint structure of the blades rigid in comparison to the rigidity of a gooseneck-shaped structure for example.

Figure 6:
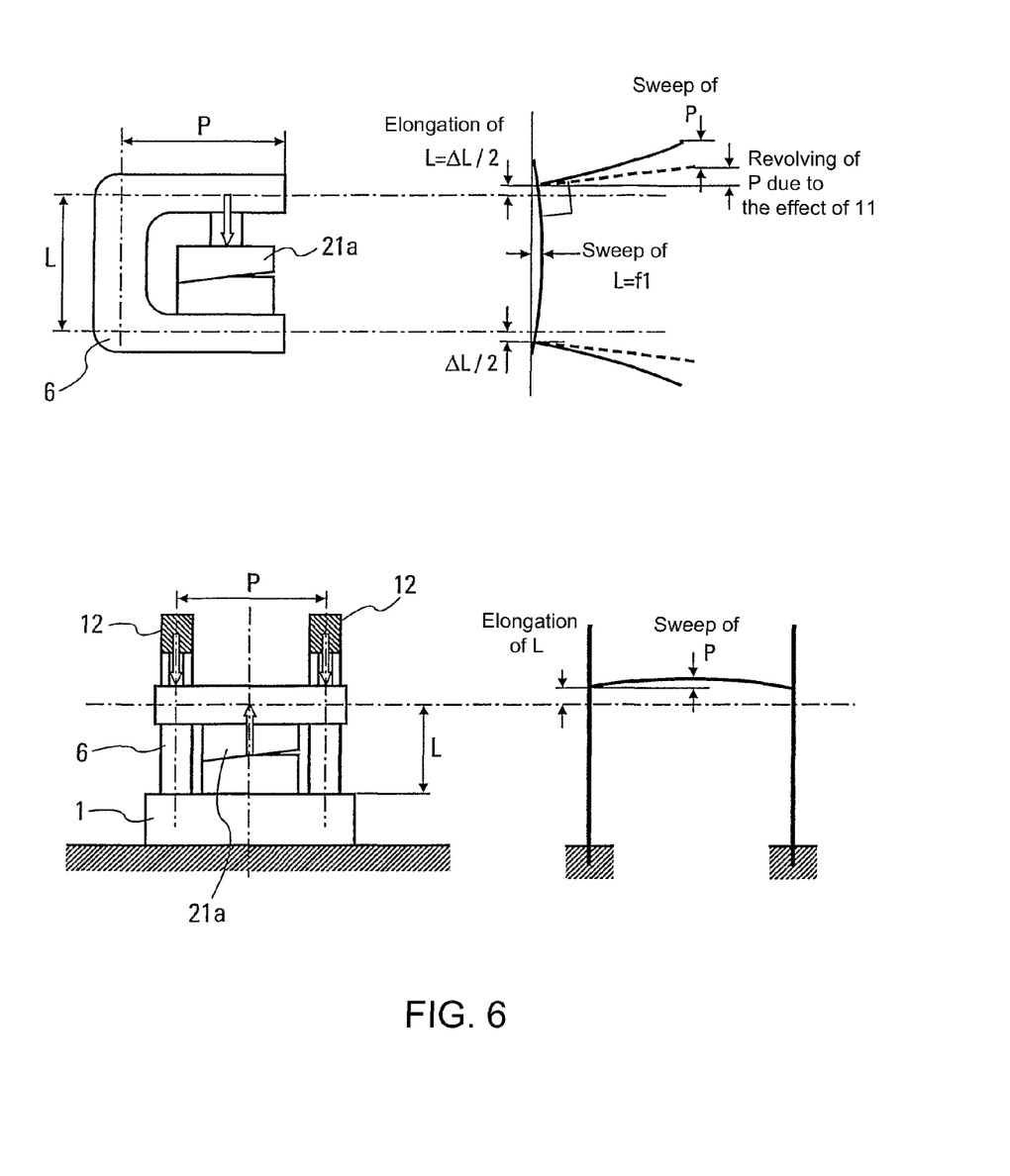
FIG. 6 is a schematic representation of a gooseneck-shaped shearing unit and of a shearing unit of the shearing press type comprising two posts in fixed relation with the frame, as well as drawings that show the stresses and the sweeps during the sheet metal cutting for each one of these shearing units, this figure demonstrating the advantage of the shearing press in comparison to a gooseneck-shaped shearing apparatus.

This increased rigidity of the joint structure of the blades is thus in favour of a precision of blades positioning all along the shearing stress. This advantage will be further described by reference to FIG. 6 which compares a shearing unit comprising a gooseneck-shaped joint structure to a joint unit supplied with two posts linked by a beam.

One can see for example that said joint structure comprises shearing jacks supported by said beam to move said first and second upper blades by comparison with said first and second lower blades.

This embodiment enables to focus the cutting stress on the beam that is a rigid place of the joint structure which thus improves the cutting quality.

One can see for example that said upper and lower blades are mounted for moving in order to adopt a position of penetration of said upper and lower blades wherein the first lower and upper blades are a first blade clearance apart and wherein the second lower and upper blades are a second blade clearance apart, the device furthermore comprising mechanical operating means adapted to make said first and second blade clearances vary due to the effect of an electronic system of control of blade clearance.

The use of mechanical means of operating disposed to make the blade clearances vary according to a command coming from an electronic system of control of blade clearance is particularly advantageous because it enables to have a cutting quality adjustable by modification of the blade clearances.

These blade clearances are chosen according to characteristics of the sheet metal strips to shear.

One can see preferably that said mechanical means of operating are adapted to move said lower blades from one another and thus to make said first and second blade clearances vary.

Preferably the electronic system of control comprises means of data collection means adapted to gather data specific to the sheet metal strip to shear and adapted to make automatically said blade clearances vary thanks to said means of operating according to said collected data.

Those data are for example the thickness of the sheet metal, its width, its hardness.

One can see for example that the Laser welding unit comprises a gooseneck-shaped structure mounted for translation by comparison with said frame and a welding head carried by the gooseneck-shaped structure.

This gooseneck-shaped structure has rigidity sufficient to stand welding stresses and thus enables the moving of the welding head opposite the areas of strips to weld while reducing the guiding inaccuracies of the welding head.

One can see for example that at least one of the posts comprises a cut-out crossing this post and that at least a part of said gooseneck-shaped structure carrying the welding head is disposed inside this cut-out in order to cross this post and to be able to slide in it.

This embodiment enables to position the gooseneck-shaped structure in an area of the device of the invention relatively rigid and that cannot be much distorted which is the area close to the upper blade(s) support beam. This embodiment is advantageous because it reduces the risk of distorsion of the device under the stresses produced during the welding and thus improves the homogeneity of the weld.

One can see for example that the welding head is mounted for sliding by comparison with the gooseneck-shaped structure through a system of guides.

This embodiment enables to move the welding head to make the welding without having to move the gooseneck-shaped structure that is relatively heavy in comparison to the welding head, this embodiment allows to control the feeding speed of the welding head.

One can see for example that the device of the invention comprises first and second guide rollers mechanically linked to the welding head in order to be moving, by motion of translation, with this welding head, the mechanical link of first and second guide rollers being adapted to position the first guide roller opposite a first side of a clamp of the clamps unit and to position the second guide roller opposite a second side of a clamp of the clamps unit, each of these guide rollers being adapted to press a sheet metal strip against the clamp side opposite which it is positioned.

This embodiment is advantageous because it enables to limit the positioning scatterings of the welding head by comparison with the edges of the sheet metal strips to weld which is in favour of the homogeneity of the weld thus obtained.

One can see for example that the mechanical link of the first and second guide rollers comprises at least a hydraulic jack adapted to bring closer and move away the first and second guide rollers to/from the respective first and second clamp sides.

One can see for example that the clamps unit comprises first and second clamps in spaced relation with one another and mechanical means of linkage of the clamps to said main frame, these means of linkage of the clamps to said main frame being adapted to move said first and second clamps from one another and by comparison with the main frame.

This embodiment enables to bring closer together and to position the sheet metal strips after having them cut without having to release the clamps. The outcome of it is a saving of time and a precision improvement in the joining process.

One can see for example that said first clamp has a lower claw and an upper claw and that one of these claws of first clamp is shorter than the other in order to enable, during the shearing of a sheet metal strip, the passing of one of said blades, this blade thus being adapted to be disposed in a position of compression of said sheared sheet metal strip against the largest claw of the first clamp.

This embodiment is advantageous because the blades are thus positioned the closest possible to the clamps which limits the size of the gap between a shearing plane of a sheet metal and the clamp carrying this sheet metal.

One can see for example that said second clamp has a lower claw and an upper claw and that one of these claws of the second clamp is shorter than the other in order to enable, during the shearing of a sheet metal strip, the passing of one of said blades, this blade thus being adapted to be disposed in a position of compression of said sheared sheet metal strip against the largest claw of the first clamp.

This embodiment is complementary to the previous one and presents the same advantages.

One can see for example that the device of the invention comprises a retractable stop moving between an up position wherein this retractable stop is disposed in a space located between the clamps of the clamps unit and a down position wherein this stop is away from the space located between the first and second clamps.

This retractable stop in down position is outside a sheet metal strip running plane in order for this sheet metal strip to run freely in the shearing unit.

In up position, this retractable stop which extends between the clamps is then useful:
- to be used in the positioning of a first sheet metal strip held in the first clamp by comparison with the first blades; and
- to be used in the positioning of a second sheet metal strip held in the second clamp by comparison with the second blades.

Indeed when the stop is in up position it can then be used to butt the tail of a first sheet metal strip and the head of the second sheet metal strip and thus position them by comparison with the shearing unit and thus with the main frame. This retractable stop belongs preferably to the shearing unit and extends preferably between sliding planes of the first and second blades.

The invention relates as well to a process of control of the device of the invention according to anyone of the embodiments above-mentioned, characterized in that a tail of a sheet metal strip to join is held thanks to a first clamp and a head of a sheet metal strip to join is held thanks to a second clamp, then the head and the tail of said sheet metal strips are sheared thanks to said shearing unit, then the sheet metal strips thus sheared are brought closer together and positioned and they are welded thanks to a Laser beam, these operations of shearing, of bringing closer, of positioning and of welding being realized without releasing the clamps.

The invention relates also to a process of Laser weld joining of sheet metals strips running in a processing steelworks, characterized in that a tail of a sheet metal strip to join is held thanks to a first clamp and a head of a sheet metal strip to join is held thanks to a second clamp, then the head and the tail of said sheet metal strips are sheared thanks to a shearing unit, then the sheet metal strips thus sheared are brought closer together and positioned and they are welded thanks to a Laser beam, these operations of shearing, of bringing closer, of positioning and of welding being realized without releasing the clamps.

The processes according to the invention enable to improve the weld quality because they allow to avoid inaccuracies that are normally generated by repositionings of strips during repeated operations of clamping/releasing.

Preferably for the implementation of the joining process of the invention, one see that the shearing unit used for the shearing operation comprises an upper blades holder, of first and second upper blades fastened on the upper blades holder in order to be in spaced relation with one another and from the first and second lower blades moving by comparison with the upper blades and adapted to shear a sheet metal strip, on the other hand one see that the shearing unit comprises at least a joint structure of said first blades, this joint structure being in fixed relation with said frame, and one realizes the shearing operation by simultaneously bringing closer the upper blades carried by the upper blades holder to the lower blades.

This embodiment enables to limit the uncertainties of relative positioning of the cuttings because:
  on one hand the cuttings of tail and head of the strips are respectively realized simultaneously by blades in fixed relation with one another mounted on the blades holder which balances the cutting stresses; and
  on the other hand the upper and lower blades are linked together through the joint structure in fixed relation with said frame.

For the implementation of the joining process of the invention, one see that the welding is realized thanks to a welding head moving in a space located between the upper blades holder and the lower blades, said blades being disposed in order to be moving between said first and second clamps.

The fact of moving a welding head between the upper blades holder and the lower blades enables to make the welding directly between the upper and lower blades without being forced to move the head and tail of strips out of the interblades gap. The outcome of it is a saving of time, of space and an improvement of the precision because the moving of the sheared head and tail of sheet metals is reduced to a minimum.

Preferably for the implementation of the Laser weld joining process of the invention, one can see that the welding is made thanks to a welding head moving in a space located between the upper blades holder and the lower blades, said blades being disposed in order to be moving between said first and second clamps.

Preferably this space for the moving of the welding head is designed to exist only when the upper blades holder and the lower blades are at least a predetermined minimal distance apart.

BRIEF DESCRIPTION OF THE SEVERAL VIEWS OF THE DRAWING

Other characteristics and advantages of the invention will be clearly highlighted by the description which is made of it, thereafter, for information only and not in the least limitative, by reference to the annexed drawings, wherein.

DESCRIPTION OF THE INVENTION

As announced before, the invention relates to a joining device 0 for Laser weld joining sheet metal strips B after having cut the ends Bt and Bq.

Figure 2A:
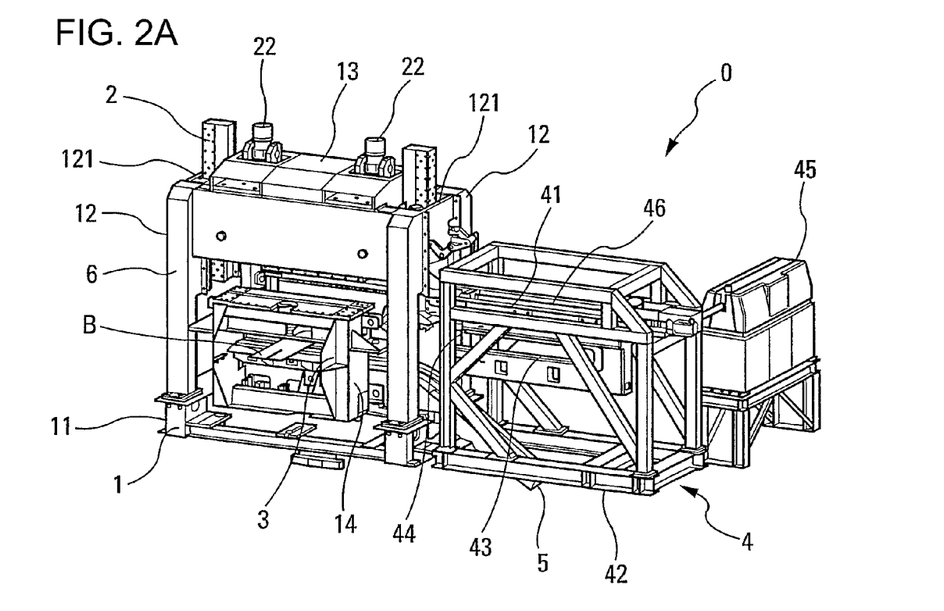
FIGS. 2a and 2b represent a device in accordance with the invention respectively seen in back and front perspective.
Figure 2B:
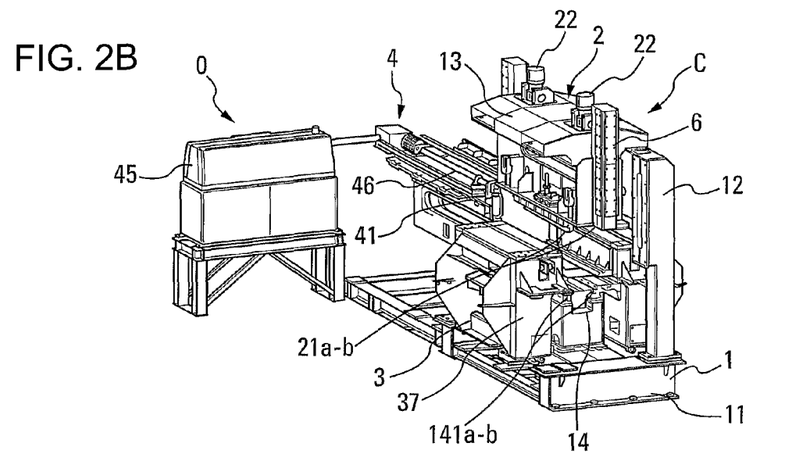
Figure 3:
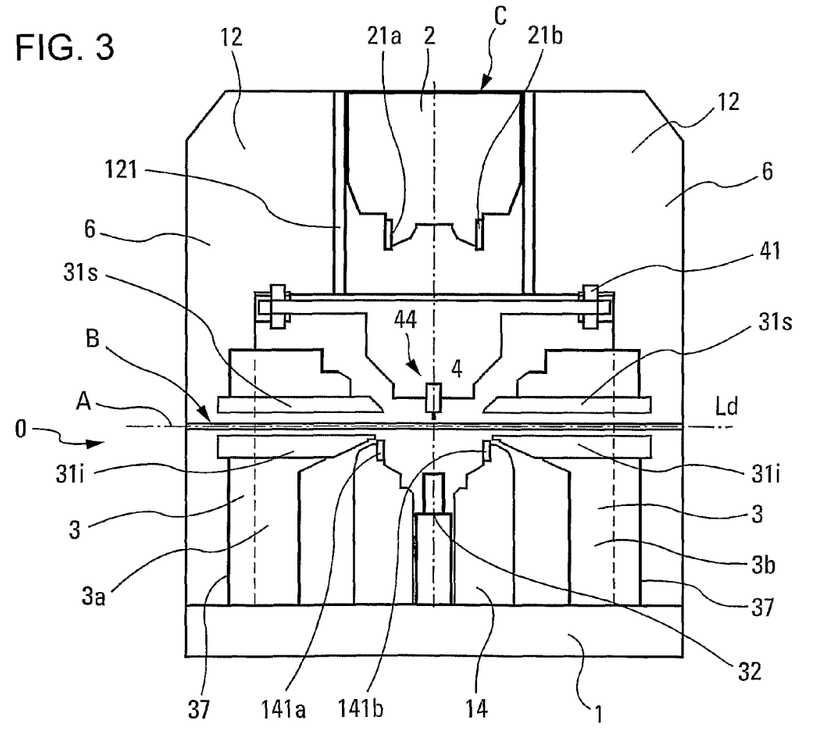
FIG. 3 is a schematic side view of the device of the invention according to a plane parallel to the axis of the sheet metal strip running while the sheet metals are running in the joining device.

The device of the invention as represented in FIGS. 2a to 3 comprises a main frame 1 fixed on the ground and comprising a platform 11, two posts 12 parallel to one another and interlocked by a beam 13 and a lower shearing frame 14 equipped with its two lower blades 141a, 141b. The lower shearing frame 14 is adapted to enable to make the clearance of the two lower blades vary in order to allow an adjustment of the blade clearance for each lower and upper pair of blades. To that purpose, parts of the frame are mounted on guides parallel to the axis of the sheet metal strip running.

The two posts 12 are carrying each a system of vertical guides 121 that are receiving an upper shearing frame 2 and its two blades 21a and 21b. The upper shearing frame 2 is operated vertically by shearing jacks 22 supported by the beam 13.

The shearing unit C of the device of the invention comprises the upper blades 21a, 21b and lower blades 141a, 141b as well as a joint structure 6 to link together the upper and lower blades, this joint structure 6 comprising the posts 12. This joint structure is in fixed relation with the frame 1 and extends around the axis A of sheet metal strip running. Thus, this structure 6 is particularly rigid and symmetrical by comparison with the running axis A. The upper blades are mounted fixedly on a blades holder in order for the clearance between the upper blades to remain constant during a cutting and so as to balance the cutting stresses. The upper blades holder is adapted to enable the passing of a Laser welding head 4 between this upper blades holder and the lower blades at least when the upper blades holder is away from the lower blades as it is the case on FIG. 3. On this FIG. 3, it shows that the welding head 4 has room enabling it to do welding in the very heart of the shearing unit when the lower and upper blades are away from one another. This characteristic enables a great positioning and welding precision as well as a saving of time in the sequence between the operations of shearing and then of welding.

It should be noted that whichever the blade clearance is chosen, the device of the invention is designed so as the blades are always parallel to one another.

This parallelism ensures that the edges of sheared strips are parallel themselves.

In order to enable the complete automatization of the joining operation, a device implementing, for example, precision screw jack ensures the moving of the upper blades or preferably of the lower blades in the direction of an increase or of a reduction of the shearing blade clearance according to the data of the product, that is to say the data specific to the sheet metals to cut (type of steel, thickness . . . ). These data are coming from primary data noted PDI standing for "Primary Data Input" input in the automatism of the conveyer line comprising the device of the invention. An electronic system of clearance control can enable to control the precision screw jacks in order to make the shearing clearance vary according to the need.

On the main frame 1 are fixed sets of clamps 3 comprising a first clamp 3a and a second clamp 3b.

Each of the clamps 3a, 3b ensures the prehension and the moving of an end of a strip to weld B thus enabling to hold each of the strips to weld in a dedicated clamp 3a, 3b. These clamps are disposed on both sides of the space wherein can slide the blades and the welding head 4.

The frame 1 also supports a system of horizontal guides 41 perpendicular to the direction of running of the strip B. These guides are extending laterally outside the frame 1. This extension is supported by a structure 42.

Figure 5A:
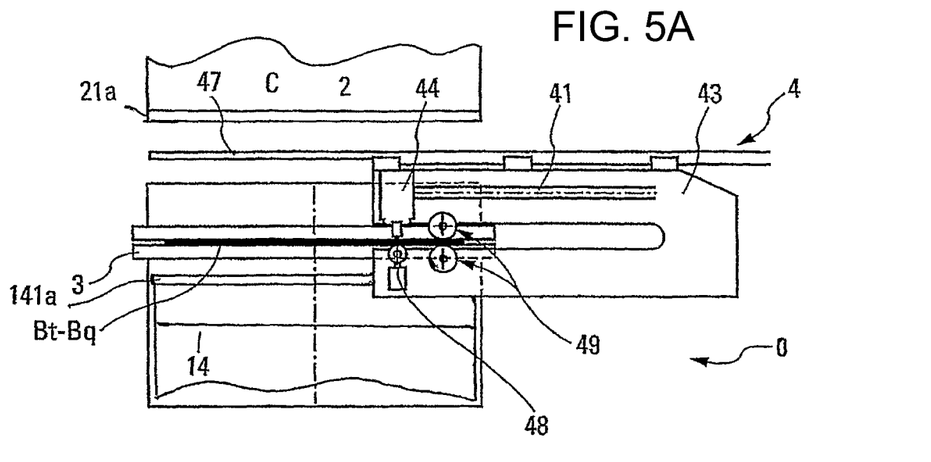

As it particularly shows on FIG. 5a, the system of guides 41 supports the gooseneck-shaped bracket 43 of the welding head 44, said bracket 43 moves on the guides 41 from its rest position under the structure 42 until it enters completely under the posts 12 of the main frame 1 in order to do the welding of the two ends of strips B held by the sets of clamps 3. On this FIG. 5b, it shows that the upper blade 21a and lower blade 141a are away from one another to enable the sliding of the welding head 44 that makes the welding.

The beam of Laser welding is generated by a fixed generator 45 (visible on FIGS. 2a and 2b) located at the end of the structure 42 in a parallel or perpendicularly to it. Said Laser beam is directed to the welding head 44 by an optical path 46 made of mirrors.

Figure 4A:
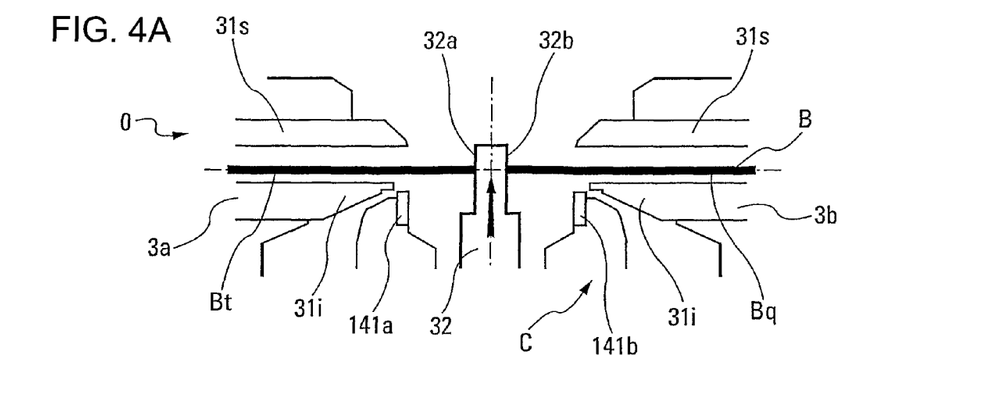
FIGS. 4a, 4b, 4c, 4d, 4e, 4f, 5a and 5b are representing successively the chronological steps implemented by the device of the invention to join two disjointed sheet metal strips.
Figure 4B:
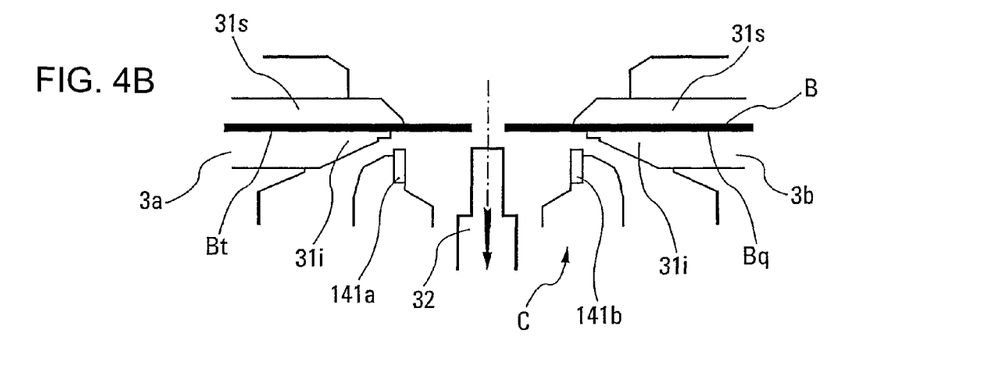
Figure 4C:
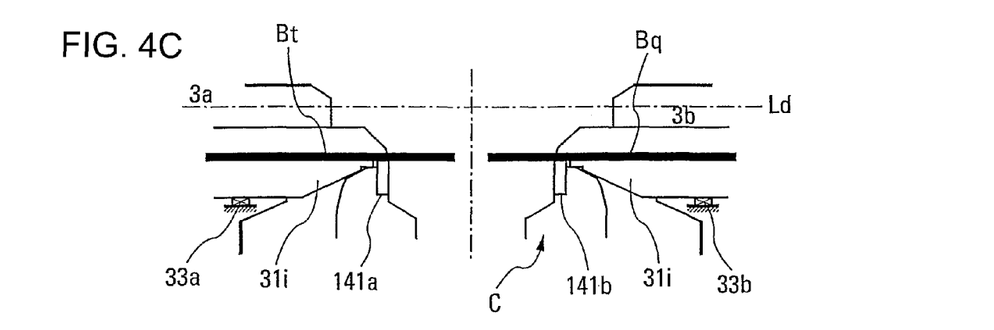
Figure 4D:
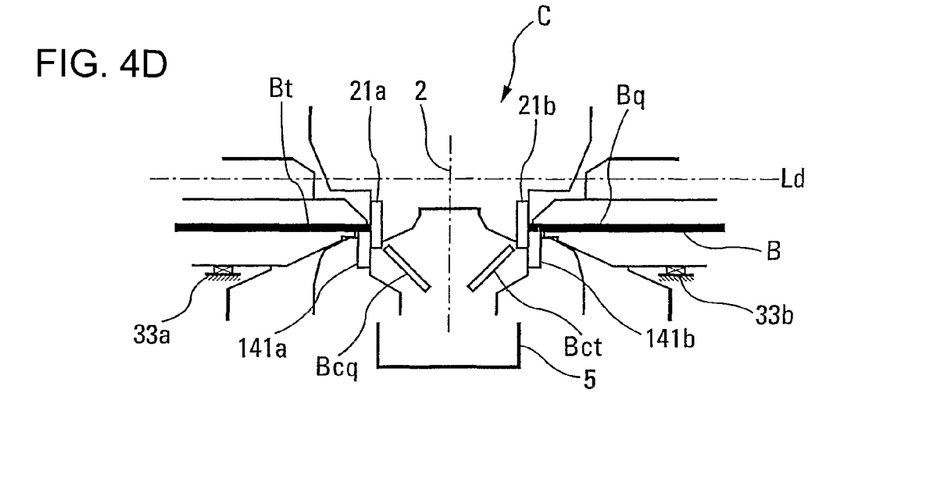

The frame 1 also supports a system 5 of recovery and of removal of the scraps from the sheared strips, this system being particularly visible on FIGS. 2a and 4d.

The joining device 0 of the invention can be equipped with pre-heating devices of the edges to weld as well as with devices of post-heating or of thermal processing of the weld.

Control devices of the quality of the welded butt joint during its making can also complete the joining device 0.

According to FIG. 3, one can see the device of the invention while it is in the phase of running of the strip B in the conveyer line, off welding operation (with the welding head away from the inter-blades gap):

The clamps 3a and 3b are at the level of the conveyer line Ld and their claws 31s and 31i are in spaced relation with one another in order to give free way to the strip B.

The upper shearing frame 2 is in completely raised position in its guides 121.

The goose-shaped frame 43 of the welding unit 4 is in position of rest.

The retractable stop 32 is in down position.

According to FIG. 4a, the strip tail Bq and the head Bt of the following strip are in the joining unit so as to be joined in it.

The retractable stop 32 is first set in up position and the devices of centring and of guiding of strip B of the transformation line upstream and downstream of the welding unit position the strip tail Bq and the head Bt of the other strip respectively resting of the sides 32b and 32a of the stop 32. The claws 31s and 31i of the claws 3a and 3b as well as the upper shearing frame 2 remain in their position of origin, that is to say away from the sheet metal strips. The gooseneck-shaped frame 43 of the welding unit 4 is always in position of rest.

According to FIG. 4b, the claws 31s and 31i of the clamps 3a and 3b are closing in to hold the two strip ends Bq and Bt. Starting from this moment, the clamps are remaining held on the strip ends in order to immobilize them in the clamps and this until the welding operation is finished (the welding operation appears on FIGS. 5a and 5b). The retractable stop 32 is going back down in down position and is moving away from the sheet metals.

According to FIG. 4c, the clamps 3a and 3b are going down in position of shearing at the level of the fixed blades 141a and 141b until the contact of the lower claws 31i with the stops 33a and 33b. Advantageously, all or part of these stops can be adjusted in height so as to ease the original adjustment of the machine.

According to FIG. 4d, the upper shearing frame 2 is pushed downward by the shearing jacks 22, the upper blades 21a and 21b in collaboration with the lower blades 141a and 141c shearing the ends Bq and Bt of the strips. The shearing scraps Bcq and Bct are recovered by the removal system 5.

Figure 4E:
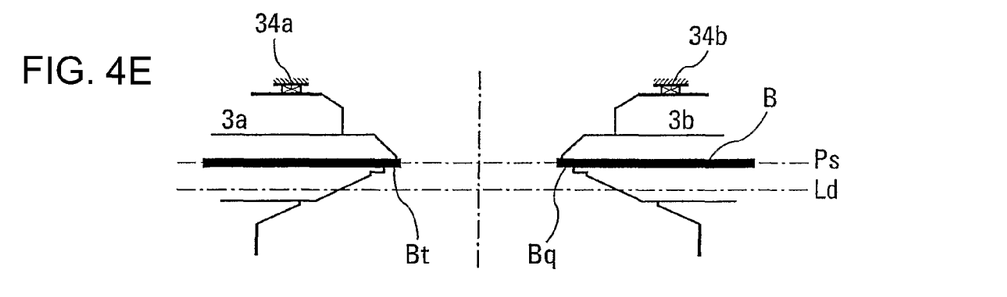

According to FIG. 4e, after going back up of the upper shearing frame 2 and thus of the upper blades, the clamps 3a and 3b are vertically transporting the ends Bq and Bt of the strips until the contact with upper stops 34a and 34b at the level of the welding plane Ps. Advantageously, all or part of these stops can be adjustable in height so as to ease the original adjustment of the machine.

Figure 4F:
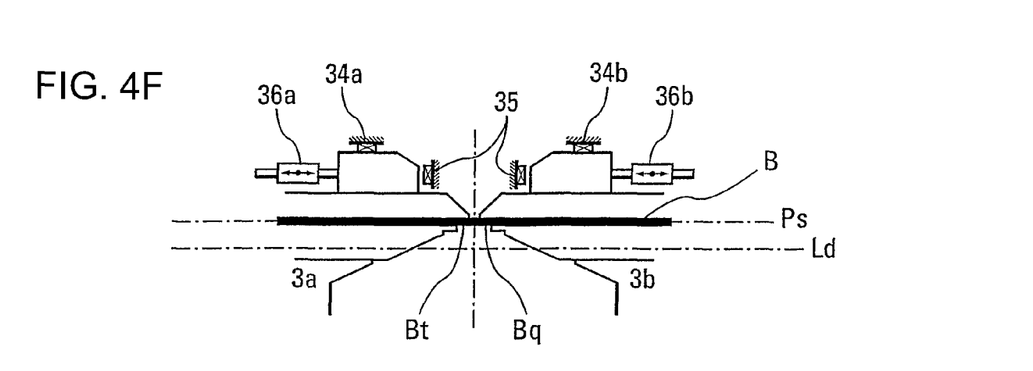

According to FIG. 4f, the clamps 3a and 3b are transporting horizontally the ends Bq and Bt of the strips while staying at the level of the welding plane Ps. A slaved moving system 36a and 36b ensures the relative positioning of the strip ends Bq and Bt in the position required for the Laser welding by taking in account certain parameters issued from data known as PDI such as the thickness of the strips and the extra thickness or under-thickness that is looked for.

A management process of the extra thickness of the Laser welds applicable with the device of the present invention is described in the patent document EP 1 591 190. It takes into account inaccuracies of shearing and of horizontal moving of the clamps 3a and 3b.

The ends Bt and Bq of strips being in required position, that is to say aligned in a parallel to the guides 41, the welding head 44 then provides the joining by welding.

In a variation of embodiment, only one of the two clamps 3a or 3b is positioned horizontally thanks to the slaved moving system 36a, 36b, the other clamp is closing in to contact side stops 35. Advantageously, all or part of these stops can be adjustable in order to ease the adjustment of the machine.

The presence and the combined use of the sets of stops 33, 34, possibly 35 and of the retractable stop 32 as well as the implementation of the process of automatic adjustment of the gap between the edges to weld thanks to device 36a, 36b enable a precise, quick and repetitive positioning of the heads and tails of the strips to join. The positioning quality of the edges to weld is perfectly adapted to the requirements of a Laser welding and the times concerning the welding are considerably reduced, thus decreasing the costs of strip accumulation.

According to FIG. 5a, the gooseneck-shaped frame 43 carrying the welding head 44 and guided by the guides 41 is making move said welding head above the ends Bq and Bt to weld due to the effect of its moving device 47. The Laser beam is initiated on the edge of the ends of the strips and is remaining along the whole width of the strips to weld. Advantageously, two rolls 49 located immediately behind the welding head and along the axis of the welded butt joint can forge a possible extra thickness of said butt joint.

Figure 5B:
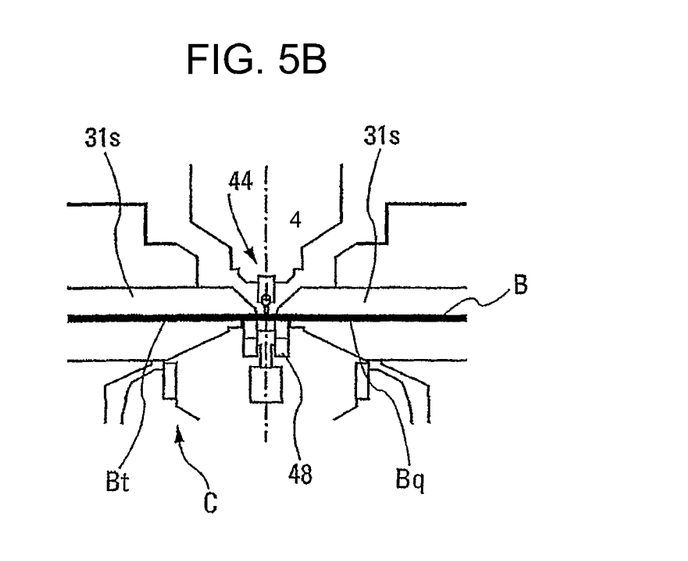

According to FIG. 5*b*, two guide rollers 48 operated by a hydraulic or pneumatic jack and located just under the welding head 44 are producing an additional clamping of the upper side of the ends Bq and Bt on the lower side of claws 31*s*.

The invention claimed is:

1. A device for laser weld joining of sheet metal strips running in a steelworks of continuous processing, comprising:
   a main frame;
   a clamping unit carried by said main frame for clamping sheet metal strips, said clamping unit including first and second clamps each configured to clamp a respective sheet metal strip;
   a shearing unit for shearing heads and tails of sheet metal strips to be joined, said shearing unit including:
      an upper blade holder, first and second upper blades fastened on said upper blade holder in spaced relation with one another;
      first and second lower blades moving relative to said upper blades and adapted to shear a sheet metal strip;
      at least one joint structure of said first blades, said joint structure being in fixed relation to said frame;
   a laser welding unit including a generator for a laser beam for welding the sheet metal strips to be joined and including a welding head slidably mounted for moving in a space located between said upper blade holder and said lower blades.

2. The device according to claim 1, wherein said first blades are movably disposed for movement between said first and second clamps.

3. The device according to claim 1, wherein said joint structure comprises two posts in fixed relation to said main frame and a beam extending between said posts, and wherein at least one of said upper blades is supported by said beam.

4. The device according to claim 3, wherein said joint structure comprises shearing jacks supported by said beam for moving said first and second upper blades relative to said first and second lower blades.

5. The device according to claim 1, wherein said upper blades and said lower blades are mounted for moving in order to adopt a position of penetration of said upper blades and lower blades wherein said first lower and upper blades are a first blade clearance apart and wherein said second lower and upper blades are a second blade clearance apart, and further comprising mechanical operating means adapted to vary said first and second blade clearances under control of an electronic system for blade clearance control.

6. The device according to claim 5, wherein said mechanical operating means are configured to move said lower blades relative to one another for varying said first and second blade clearances.

7. The device according to claim 5, wherein said electronic system comprises data collection means adapted to gather and collect data specific to the sheet metal strip to shear and adapted to vary said blade clearances automatically in dependence on the data thus collected.

8. The device according to claim 1, wherein said laser welding unit comprises a gooseneck-shaped structure mounted for translation relative to said frame and carrying said welding head.

9. The device according to claim 3, wherein said laser welding unit comprises a gooseneck-shaped structure mounted for translation relative to said frame and carrying said welding head, and wherein at least one of said posts is formed with a cut-out crossing the post and at least a part of said gooseneck-shaped structure carrying said welding head is disposed inside said cut-out, in order to cross said post and to be able to slide therein.

10. The device according to claim 8, wherein said welding head is mounted for sliding relative to said gooseneck-shaped structure through a system of guides.

11. The device according to claim 1, wherein said first and second clamps are disposed in spaced relation with one another and said clamping unit comprises mechanical linking means of said clamps to said main frame adapted to move said first and second clamps from one another and relative to said main frame.

12. A method for laser weld joining of sheet metal strips running in a steelworks of continuous processing, which comprises:
   holding a tail of a sheet metal strip to be joined with a first clamp and holding a head of a sheet metal strip to be joined with a second clamp;
   shearing the head and the tail of the sheet metal strips in a shearing unit having an upper blade holder and first and second lower blades;
   subsequently moving the sheet metal strips so sheared closer together; and
   subsequently welding with a laser beam with a welding head moved into a space in the shearing unit between the upper blades holder and the lower blades; and
   thereby performing the shearing step, the moving step, and the welding step without releasing the clamps.

13. The method according to claim 12, wherein:
   the shearing step is performed with first and second upper blades fastened to the upper blade holder in spaced relationship and the first and second lower blades moving relative to the upper blades and configured to shear a sheet metal strip;
   the shearing unit includes at least a joint structure of the first blades, the joint structure being fixed relative to a frame; and
   the shearing step includes simultaneously bringing closer together the upper blades, carried by the upper blades holder, and the lower blades.

14. The method according to claim 13, wherein the blades are disposed to be moved between the first and second clamps.

* * * * *